United States Patent
El Zur et al.

(10) Patent No.: US 8,321,658 B2
(45) Date of Patent: *Nov. 27, 2012

(54) METHOD AND SYSTEM FOR ISCSI BOOT IN WHICH AN ISCSI CLIENT LOADS BOOT CODE FROM A HOST BUS ADAPTER AND/OR NETWORK INTERFACE CARD

(75) Inventors: Uri El Zur, Irvine, CA (US); Kan Frankie Fan, Diamond Bar, CA (US); Murali Rajagopal, Irvine, CA (US); Kevin Tran, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/826,075

(22) Filed: Jun. 29, 2010

(65) Prior Publication Data
US 2010/0306521 A1    Dec. 2, 2010

Related U.S. Application Data

(63) Continuation of application No. 11/389,980, filed on Mar. 27, 2006, now Pat. No. 7,747,847.

(60) Provisional application No. 60/665,282, filed on Mar. 25, 2005.

(51) Int. Cl.
*G06F 15/177* (2006.01)

(52) U.S. Cl. ............................................ 713/2; 709/222

(58) Field of Classification Search ........ 713/2; 709/222
See application file for complete search history.

(56) References Cited

U.S. PATENT DOCUMENTS

| 7,360,072 B1 | 4/2008 | Soltis et al. |
| 7,380,095 B2 * | 5/2008 | Matheny ...................... 711/202 |
| 7,418,588 B2 * | 8/2008 | Lin et al. .......................... 713/2 |
| 2003/0126242 A1 * | 7/2003 | Chang .......................... 709/222 |
| 2005/0138346 A1 | 6/2005 | Cauthron |
| 2005/0216715 A1 * | 9/2005 | Matheny et al. ................. 713/1 |

OTHER PUBLICATIONS

Intel Corporation, Preboot Execution Environment (PXE) Specification, Version 2.1, Sep. 20, 1999.*

* cited by examiner

*Primary Examiner* — Albert Wang
(74) *Attorney, Agent, or Firm* — Thomas|Horstemeyer, LLP

(57) ABSTRACT

Certain aspects of a method for iSCSI boot may include loading boot BIOS code from a host bus adapter or a network interface controller (NIC) by an iSCSI client device. A connection may be established to an iSCSI target by the iSCSI client device after loading the boot BIOS code. The boot BIOS code may be chained to at least one interrupt handler over iSCSI protocol. An operating system may be remotely booted from the iSCSI target by the iSCSI client device based on chaining the interrupt handler. An Internet protocol (IP) address and/or location of the iSCSI target may be received. At least one iSCSI connection may be initiated to the iSCSI target based on chaining at least one interrupt handler. The iSCSI target may be booted in real mode if at least one master boot record is located in the memory.

19 Claims, 10 Drawing Sheets

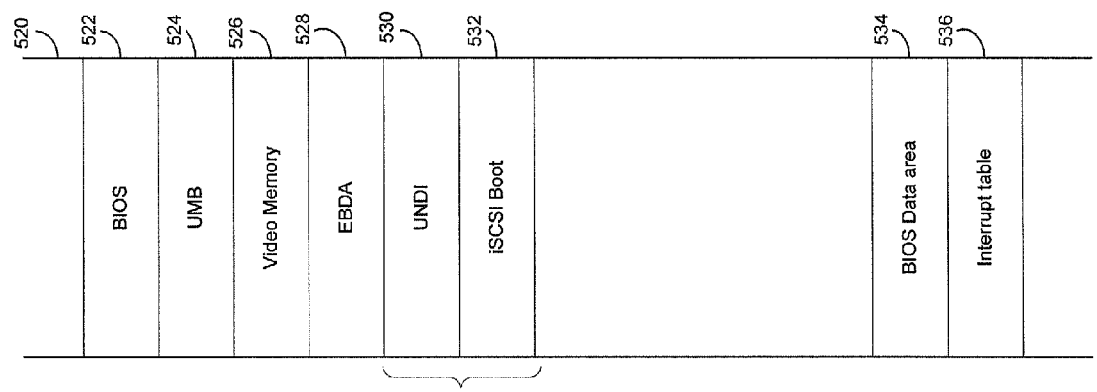

METHOD AND SYSTEM FOR ISCSI BOOT IN WHICH AN ISCSI CLIENT LOADS BOOT CODE FROM A HOST BUS ADAPTER AND/OR NETWORK INTERFACE CARD

CROSS-REFERENCE TO RELATED APPLICATIONS/INCORPORATION BY REFERENCE

This application is a continuation of U.S. application Ser. No. 11/389,980 filed on Mar. 27, 2006, which application makes reference to, claims priority to, and claims the benefit of U.S. Provisional Patent Application Ser. No. 60/665,282 filed Mar. 25, 2005.

The following application makes reference to:
U.S. patent application Ser. No. 11/156,289 filed Jun. 17, 2005;
U.S. Provisional Patent Application Ser. No. 60/565,675 filed Apr. 27, 2004;
U.S. patent application Ser. No. 11/156,206 filed Jun. 17, 2005;
U.S. patent application Ser. No. 11/156,182 filed Jun. 17, 2005;
U.S. patent application Ser. No. 11/156,110 filed Jun. 17, 2005; and
U.S. patent application Ser. No. 11/155,966 filed Jun. 17, 2005.

Each of the above stated applications is hereby incorporated herein by reference in its entirety.

FIELD OF THE INVENTION

Certain embodiments of the invention relate to networking systems, methods and architectures. More specifically, certain embodiments of the invention relate to a method and system for an iSCSI boot.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) with 10-Gigabit on the horizon, have outpaced the capability of central processing units (CPUs). To compensate for this dilemma and to free up CPU resources to handle general computing tasks, offloading Transmission Control Protocol/ Internet Protocol (TCP/IP) functionality to dedicated network processing hardware is a fundamental improvement. TCP/IP chimney offload maximizes utilization of host CPU resources for application workloads, for example, on Gigabit and multi-Gigabit networks.

TCP/IP chimney offload provides a holistic technique for segmenting TCP/IP processing into tasks that may be handled by dedicated network processing controller hardware and an operating system (OS). TCP/IP chimney offload redirects most of the TCP/IP related tasks to a network controller for processing, which frees up networking-related CPU resources overhead. This boosts overall system performance, and eliminates and/or reduces system bottlenecks. Additionally, TCP/IP chimney offload technology may play a key role in the scalability of servers, thereby enabling next-generation servers to meet the performance criteria of today's high-speed networks such as Gigabit Ethernet (GbE) networks.

Although TCP/IP offload is not a new technology, conventional TCP/IP offload applications have been platform specific and were not seamlessly integrated with the operating system's networking stack. As a result, these conventional offload applications were standalone applications, which were platform dependent and thus severely affected deployment. Furthermore, the lack of integration within an operating system's stack resulted in two or more independent and different TCP/IP implementations running on a single server, which made such systems more complex to manage.

TCP/IP chimney offload may be implemented using a PC-based or server-based platform, an associated operating system (OS) and a TCP offload engine (TOE) network interface card (NIC). The TCP stack is embedded in the operating system of a host system. The combination of hardware offload for performance and host stack for controlling connections, results in the best OS performance while maintaining the flexibility and manageability of a standardized OS TCP stack. TCP/IP chimney offload significantly boosts application performance due to reduced CPU utilization. Since TCP/IP chimney offload architecture segments TCP/IP processing tasks between TOE's and an operating system's networking stack, all network traffic may be accelerated through a single TCP/IP chimney offload compliant adapter, which may be managed using existing standardized methodologies. Traditional TCP offload as well as TCP chimney offload are utilized for wired and wireless communication applications.

Internet Small Computer System Interface (iSCSI) is a TCP/IP-based protocol that is utilized for establishing and managing connections between IP-based storage devices, hosts and clients. The iSCSI protocol describes a transport protocol for SCSI, which operates on top of TCP and provides a mechanism for encapsulating SCSI commands in an IP infrastructure. The iSCSI protocol is utilized for data storage systems utilizing TCP/IP infrastructure.

There may be a plurality of challenges with providing a complete and robust iSCSI boot implementation. The boot process goes through from real mode to protected mode, from BIOS governed to OS controlled environment, through various phases of the OS boot, where memory ownership and control may change frequently. Multiple physical devices may try and control the memory or may need software to be present in memory for proper operation. As this environment is not subject to standardization, the memory content may be altered, where multiple devices may compete for the same space. The memory space available in real mode is very limited.

The iSCSI boot solution needs to be complete. As it enables a machine to use a remote network resident storage device as if it was a locally attached hard drive, it must also provide the service for a crash dump scenario. In this scenario, the OS crashes and a dump of the memory along with potentially other state information is stored on the hard disk. This needs to be supported over the iSCSI connection, which is challenging, as the OS is not in its full running mode and driver model and memory model are different.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an iSCSI boot substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5C is a block diagram illustrating a memory map of a stack at crash dump, in accordance with an embodiment of the invention.

DETAILED DESCRIPTION OF THE INVENTION

Certain aspects of a method for iSCSI boot may include loading boot BIOS code from a host bus adapter by an iSCSI client device. A connection may be established to an iSCSI target by the iSCSI client device after loading the boot BIOS code. The boot BIOS code may be chained to at least one interrupt handler. An operating system may be remotely booted from the iSCSI target by the iSCSI client device based on chaining the interrupt handler.

At least one of the IP address and the iSCSI target location may be statically configured or dynamically determined from a dynamic host configuration protocol (DHCP) server. The boot BIOS code may be chained to at least one interrupt handler to redirect disk access requests during the real mode to at least one remote disk over the iSCSI protocol. A processor may attempt to locate at least one master boot record. At least one volume boot record for an active bootable partition may be located if at least one master boot record is located. At least one file may be loaded to collect at least one of hardware information and registry information. At least one processor may be switched to boot in protected mode after at least one file is loaded.

In accordance with an embodiment of the invention, iSCSI boot may be utilized to facilitate initialization of an operating system from a storage disk array connected over a network using iSCSI protocol, for example, rather than from a locally direct attached hard disk drive (DAS). In accordance with an aspect of the invention, a blade server may be adapted to boot from a remote location utilizing iSCSI boot. By utilizing iSCSI boot from a remote location, the number of local hard drives utilized by blade servers may be significantly reduced and/or local hard drives may not be utilized by blade servers altogether. The resulting storage consolidation may reduce blade server costs and facilitate blade server maintenance. The blade server board design may be simplified and server form factor may be reduced by utilizing iSCSI boot. The iSCSI boot may also allow increased flexibility as boot and data may be managed at a central location, simplifying re-imaging and patching. This eliminates a need for going to remote locations to service malfunctioning disks. It allows re-targeting servers much faster. In case of a failure a stand-by server may boot from the image just saved by the server that has failed. For load balancing, the server may be targeted at a new image while another server boots from its previous image.

Figure 1:
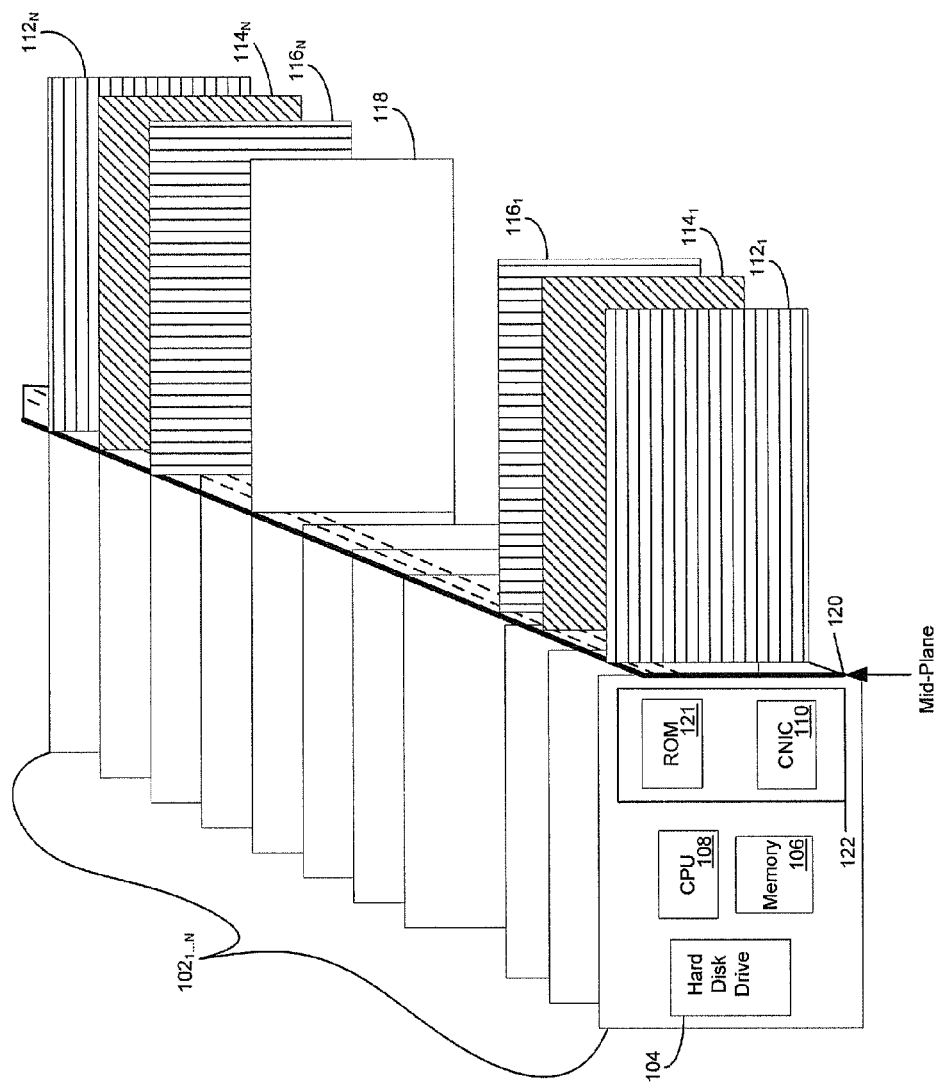
FIG. 1 is a block diagram of a blade system, in accordance with an embodiment of the invention.

FIG. 1 is a block diagram of a blade system, in accordance with an embodiment of the invention. Referring to FIG. 1, the blade system may comprise a plurality of blade servers $102_{1...N}$, a plurality of network switches $112_{1...N}$, a plurality of storage switches $114_{1...N}$, a plurality of cluster blades $116_{1...N}$, a management blade 118 and a mid-plane 120.

The plurality of blade servers $102_{1...N}$ may each comprise a hard disk drive 104, or several hard drives, a memory 106, a central processing unit 108 and a host bus adaptor (HBA) 122. The HBA 122 may comprise a converged network interface card (CNIC) processor 110, and a ROM 121. The hard disk drive 102 may be utilized, for example, for storing blade server boot data. The boot data may be utilized during a blade server boot. In an exemplary aspect of the invention, iSCSI boot may be utilized by one or more blade servers $102_{1...N}$ within the exemplary blade system of FIG. 1. In this regard, one or more local hard disk drives, such as the local hard disk drive 104, may be removed from a corresponding blade server.

The memory 106 may comprise suitable logic, circuitry and/or logic that may enable storage of a master boot record and a boot basic input/output system (BIOS) code. The master boot record is present on the first sector of a hard disk and contains the Ntldr, boot.ini, Ntdetect, and .com files, for example, in the case of a Windows OS. The CPU running BIOS code pulls this sector during boot and examines it to see if it is indeed MBR. The CPU 108 and the associated BIOS code may comprise suitable logic, circuitry and/or logic that may enable detection of at least one read only memory (ROM) 121 comprising boot BIOS code on at least one host bus adapter (HBA) 122 or a network interface Controller (NIC) adapted for boot operation. The CPU 108 may enable loading of a boot BIOS code into memory 106 if at least one boot ROM 121 comprising boot BIOS code is detected. The CPU 108 may receive an Internet protocol (IP) address and an iSCSI target location of a client. The boot BIOS code may be chained by the CPU to at least one interrupt handler over iSCSI protocol. The CPU 108 may initiate at least one iSCSI connection to the iSCSI target based on chaining at least one interrupt handler. However the timing of this association between the BIOS code and the code provided by the iSCSI boot device and the memory space used are critical. One embodiment of this invention uses boot entry vector (BEV) as a mechanism to load universal network driver interface (UNDI) driver and iSCSI boot initiator code to low memory. The UNDI code and iSCSI over TCP/IP stack code remains stable in this memory location until the computer is powered off. The iSCSI boot may use the BIOS boot connection vector (BCV) to load iSCSI boot code into low memory at an earlier phase during boot, for example, POST time, which may potentially lead to a low memory corruption by BIOS or other expansion ROM code. The use of BEV ensures no corruption of the iSCSI boot code in low memory and may additionally guarantee residence when needed for crash dump, which is not guaranteed by the BCV mechanism due to possibility of corruption.

The HBA 122 may comprise suitable logic, circuitry and/or logic that may enable processing and physical connectivity between a server and a storage device. The HBA 122 may relieve the host microprocessor of both data storage and retrieval tasks, and may improve the server's performance time.

The CNIC processor 110 may comprise suitable logic, circuitry and/or code that may be adapted to support TCP offload (TOE), iSCSI, and remote direct memory access (RDMA). The CNIC processor 110 may enable a converged fabric for networking, storage, and clustering. The CNIC processor 110 may be utilized in blade servers $102_1 \ldots _N$, where multiple fabrics may require wider backplanes, more power, and more slots.

The plurality of network switches $112_1 \ldots _N$ may comprise suitable logic, circuitry and/or code that may enable interconnection of multiple computers together using a low-level communication protocol such as Ethernet. The plurality of network switches $112_1 \ldots _N$ may enable inspection of the data packets as they are received, determining the source and destination device of that packet, and forwarding that packet accordingly. The plurality of network switches $112_1 \ldots _N$ may conserve network bandwidth by delivering messages to the connected destination or intended destination device.

The plurality of storage switches $114_1 \ldots _N$ may comprise suitable logic, circuitry and/or code that may enable channeling incoming data from multiple input ports to a specific output port that may transport the data toward its intended destination. The plurality of cluster blades $116_1 \ldots _N$ may comprise suitable logic, circuitry and/or code that may enable grouping a cluster of server blades to function as a single system. The management blade 118 may comprise suitable logic, circuitry and/or code that may enable management and communication with the plurality of blade servers $102_1 \ldots _N$, plurality of network switches $112_1 \ldots _N$, plurality of storage switches $114_1 \ldots _N$ and the plurality of cluster blades $116_1 \ldots _N$ to an external console. The mid-plane 120 may be utilized by the blade system to interconnect the plurality of blade servers $102_1 \ldots _N$, the plurality of network switches $112_1 \ldots _N$, the plurality of storage switches $114_1 \ldots _N$, the plurality of cluster blades $116_1 \ldots _N$ and the management blade 118. In one embodiment of the invention, the mid-plane 120 may be a common bus that interconnects devices coupled thereto.

Figure 2:
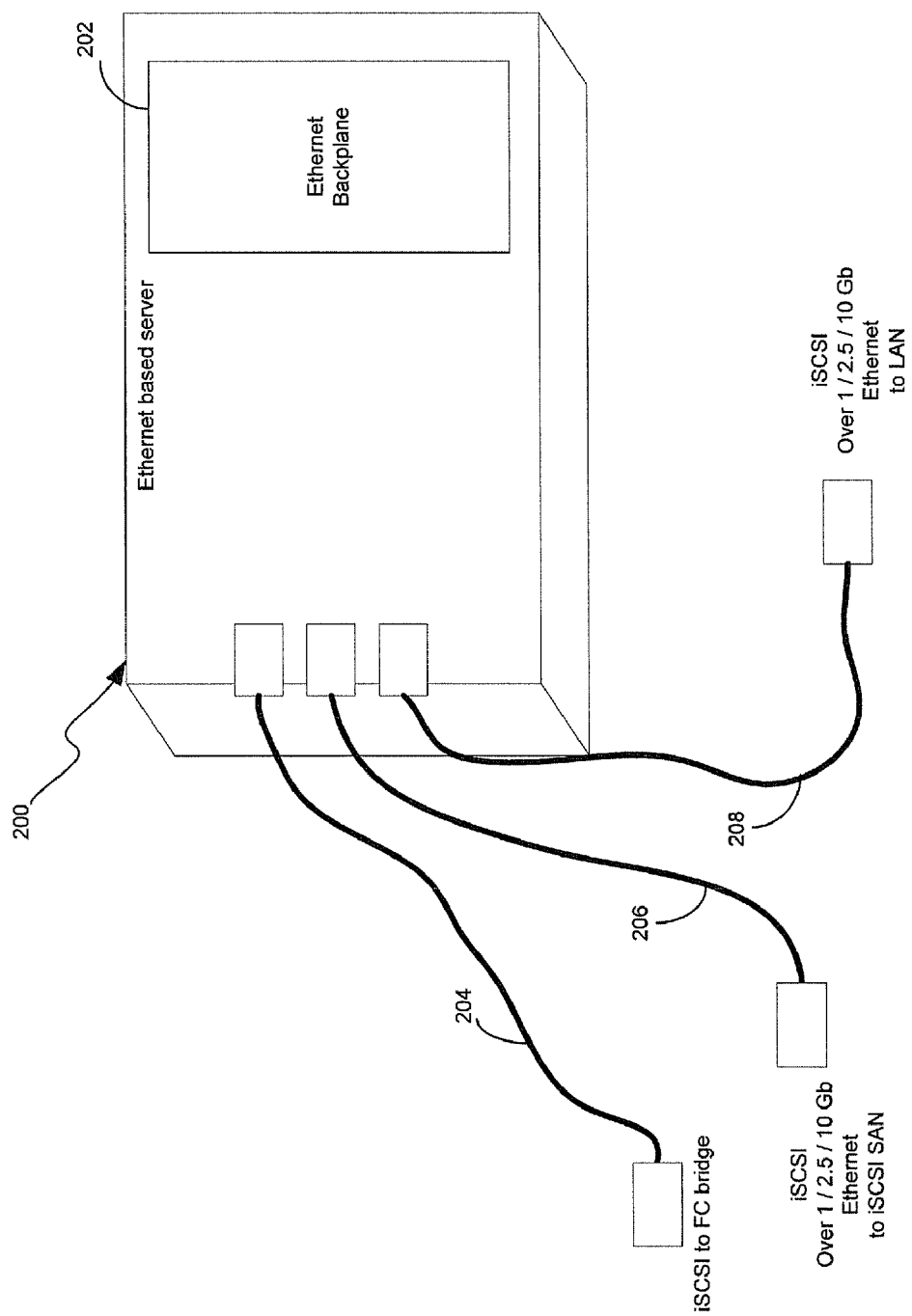
FIG. 2 is a block diagram of an iSCSI boot device for server blade eco-system, in accordance with an embodiment of the invention.

FIG. 2 is a block diagram of an iSCSI boot device for a server blade eco-system, in accordance with an embodiment of the invention. Referring to FIG. 2, there is shown an Ethernet based blade server 200. The Ethernet-based blade server 200 may comprise an Ethernet backplane 202. The Ethernet based blade server 200 may enable utilization of 1, 2.5 or 10 Gigabit (Gb) or any other speed on the Ethernet backplane 202 for iSCSI and standard local area network (LAN) traffic signals. The iSCSI target may reside on another blade inside the chassis. The iSCSI target may be reachable through an optional iSCSI to Fibre Channel (FC) bridge 204 if the target resides on Fibre Channel or directly over 1, 2.5 or 10 Gb Ethernet if the target is a native iSCSI target residing and accessible over Ethernet connection 208.

The iSCSI to Fibre Channel (FC) bridge 204 or storage area network (SAN) connection may be utilized to convert iSCSI based signals to FC based signals for processing by a FC SAN, for example. The iSCSI and standard LAN traffic may coexist on a single backplane with a physical separation or a logical separation, for example, a virtual local area network (VLAN). In an exemplary aspect of the invention, an integrated iSCSI redundant array of independent disks (RAID) array on a blade or an external array may be utilized for the OS boot. The iSCSI boot eco-system may comprise OS image preparation, DHCP server configuration, iSCSI initiator configuration, and iSCSI target configuration.

Figure 3:
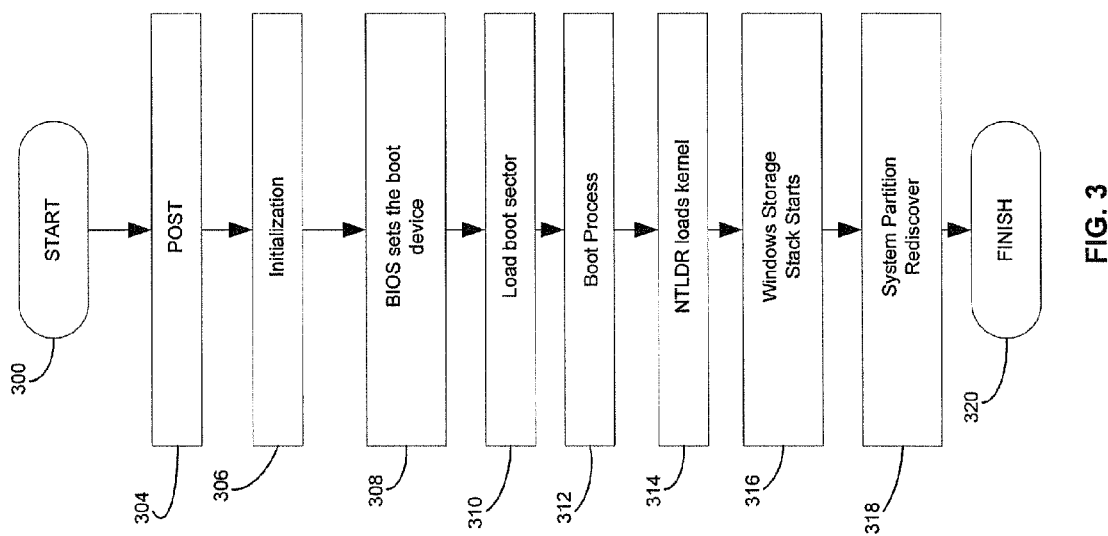
FIG. 3 is a flow diagram illustrating exemplary steps for an operating system boot using direct attached storage (DAS) as an example, in accordance with an embodiment of the invention.

FIG. 3 is a flow diagram illustrating exemplary steps for an operating system boot using direct attached storage (DAS) as an example, in accordance with an embodiment of the invention. Referring to FIG. 3, exemplary steps may start at step 300. In step 304, a power ON self test (POST) may be performed. During POST, the system BIOS stored on ROM may initiate a diagnostic test of all hardware devices to ensure integrity of the hardware and that there are no hard disk failures and/or voltage irregularities. In step 306, during initialization the BIOS may first locate all add-in devices, such as network interface cards, HBAs, local system hard drives and floppy drives. Subsequently, it may be determined which devices are bootable. In step 308, the BIOS may set the boot device. The boot device may be either the first bootable device found, or the boot device may be set by the user in the case of multi-boot capable systems. During the boot device setting, the BIOS may assign the selected device a drive ID=80h, for example, which may correspond to the boot drive.

In step 310, the boot sector may be loaded. In some instances, such as x86 systems, it may be required that the first sector of the primary disk comprise the master boot record (MBR). The MBR may comprise a bootstrap code, a master partition table and signature bytes. A desired partition used to boot Windows, for example, may be set as active, or bootable set to 80h, for example, in the master partition table in order to proceed. The boot sector may load the network loader (NTLDR) file in memory, which may then begin loading the operating system (OS) in a series of phases.

In step 312, the boot process may be initiated. In step 314, the NTLDR file, for example, may load an OS kernel. The file on the boot partition, for example, BOOT.INI may communicate to the NTLDR file where the OS kernel, registry, and/or device drivers reside. The NTLDR file may launch a file for example, network detect (NTDETECT) to collect hardware information and the NTLDR file may pass information collected by the NTDETECT file to a network operating system kernel (NTOSKRNL), for example. The NTOSKRNL may then load kernel, hardware abstraction layer (HAL), and/or registry information. In step 316, the kernel may start storage class driver, port driver and/or miniport drivers. The hardware store find adapter and hardware store initialize handlers may initialize the HBA 122 hardware and the storage stack may discover the targets and the logical units (LUNs). In step 318, the system partition may be used for fetching other device drivers and services. The operating system, for example, Windows may then start sub-systems and log on procedures, to get ready for user login. Control may then pass to finish step 320.

Figure 4A:
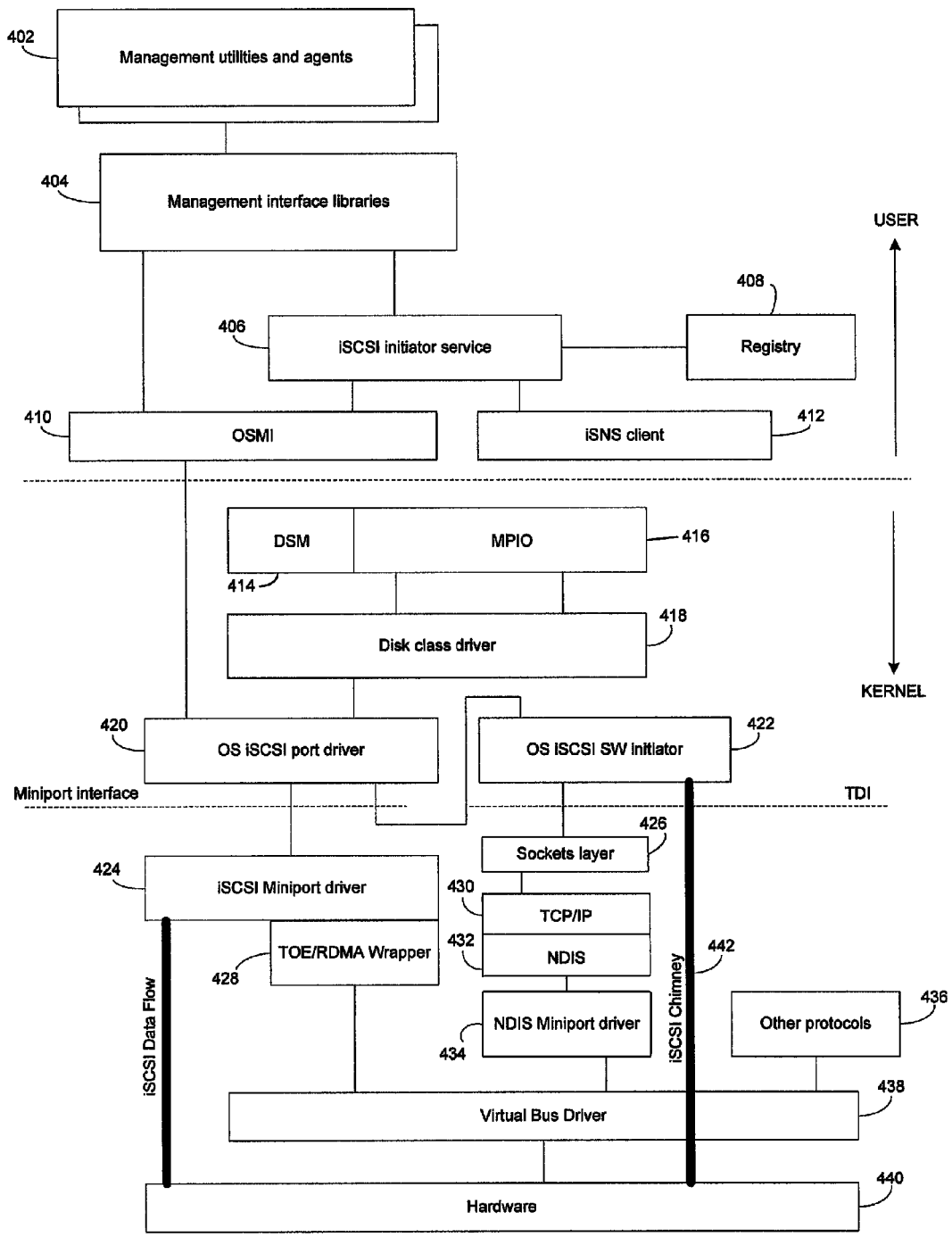
FIG. 4A is a block diagram illustrating the iSCSI software architecture in an iSCSI initiator application, in accordance with an embodiment of the invention.

FIG. 4A is a block diagram illustrating the iSCSI software architecture in an iSCSI initiator application, in accordance with an embodiment of the invention. Referring to FIG. 4A, there is shown a management utilities and agents block 402, a management interface libraries block 404, an iSCSI initiator service block 406, a registry block 408, a OS Management Instrumentation (OSMI) block 410, an Internet Storage Name Service (iSNS) client block 412, a device specific module (DSM) block 414, a multi-path input output (MPIO) block 416, a disk class driver block 418, a OS iSCSI port driver block 420, an iSCSI software initiator block 422, a sockets layer block 426, a TCP/IP block 430, a network driver interface specification (NDIS) block 432, a NDIS miniport driver block 434, an iSCSI miniport driver block 424, a TCP offload engine (TOE)/remote direct memory access (RDMA) wrapper block 428, an other protocols block 436, a virtual bus driver block 438, a hardware block 440 and an iSCSI chimney 442.

The management utilities and agents block 402 may comprise suitable logic, circuitry and/or code that may be adapted to configure device management and control panel applications. The management interface libraries block 404 may comprise suitable logic, circuitry and/or code that may be adapted to manage and configure various interface libraries in the operating system. The management interface libraries block 404 may be coupled to the management utilities and agents block 402, the iSCSI initiator service block 406 and the OS Management Instrumentation (OSMI) block 410. The iSCSI initiator service block 406 may be adapted to manage a plurality of iSCSI initiators, for example, network adapters and host bus adapters on behalf of the operating system.

The iSCSI initiator service block 406 may be adapted to aggregate discovery information and manage security. The iSCSI initiator service block 406 may be coupled to the management interface libraries block 404, the registry block 408, the iSNS client block 412 and the OS Management Instrumentation (OSMI) block 410. The registry block 408 may comprise a central hierarchical database that may utilized by an operating system, for example, Microsoft Windows 9x, Windows CE, Windows NT, Windows 2000, Windows 2003 and Windows Vista to store information necessary to configure the system for one or more users, applications and hardware devices. The registry block 408 may comprise information that the operating system may reference during operation, such as profiles for each user, the applications installed on the computer and the types of documents that each may create, property sheet settings for folders and application icons, what hardware exists on the system, and the ports that are being used.

The OS Management Instrumentation (OSMI) block 410 may be adapted to organize individual data items properties into data blocks or structures that may comprise related information. Data blocks may have one or more data items. Each data item may have a unique index within the data block, and each data block may be named by a globally unique 128-bit number, for example, called a globally unique identifier (GUID). The OSMI block 410 may be adapted to provide notifications to a data producer as to when to start and stop collecting the data items that compose a data block. The OS Management Instrumentation (OSMI) block 410 may be further communicatively coupled to the OS iSCSI port driver block 420.

The Internet Storage Name Service (iSNS) client block 412 may comprise suitable logic, circuitry and/or code that may be adapted to provide both naming and resource discovery services for storage devices on an IP network. The iSNS client block 412 may be adapted to build upon both IP and Fiber Channel technologies. The iSNS protocol may use an iSNS server as the central location for tracking information about targets and initiators. The iSNS server may run on any host, target, or initiator on the network. The iSNS client software may be required in each host initiator or storage target device to enable communication with the server. In an initiator, the iSNS client block 412 may register the initiator and query the list of targets. In a target, the iSNS client block 412 may register the target with the server.

The multi-path input output MPIO block 416 may comprise generic code for vendors to adapt to their specific hardware device so that the operating system may provide the logic necessary for multi-path I/O for redundancy in case of a loss of a connection to a storage target. The device specific module DSM block 414 may play a role in a number of critical events, for example, device-specific initialization, request handling, and error recovery. During device initialization, each DSM block 414 may be contacted in turn to determine whether or not it may provide support for a specific device. If the DSM block 414 supports the device, it may then indicate whether the device is a new installation, or a previously installed device which is now visible through a new path. During request handling, when an application makes an I/O request to a specific device, the DSM block 414 may determine based on its internal load balancing algorithms, a path through which the request should be sent. If an I/O request cannot be sent down a path because the path is broken, the DSM block 414 may be capable of shifting to an error handling mode, for example. During error handling, the DSM block 414 may determine whether to retry the input/output (I/O) request, or to treat the error as fatal, making fail-over necessary, for example. In the case of fatal errors, paths may be invalidated, and the request may be rebuilt and transmitted through a different device path.

The disk class driver block 418 may comprise suitable logic, circuitry and/or code that may be adapted to receive application requests and convert them to SCSI commands, which may be transported in command description blocks (CDBs). The disk class driver block 418 may be coupled to the OS iSCSI port driver block 420 and the iSCSI software initiator block 422. In an operating system, for example, Windows, there might be at least two paths where the networking stack may be utilized. For example, an iSCSI software initiator block 422 may be adapted to support an iSCSI chimney 442 by allowing direct exchange of iSCSI CDBs, buffer information and data to and from the hardware 440 without further copying of the data. The second path may utilize an iSCSI miniport driver 424. The iSCSI miniport driver 424 may interface with the hardware 440 in the same fashion as described above for the iSCSI software initiator block 422.

The use of a potential iSCSI chimney 442 from the hardware 440 to the iSCSI software initiator block 422 eliminates data copy and computing overhead from the iSCSI path but also allows the operating system to use one TCP stack for networking and storage providing a more robust solution as compared to using a third party TCP stack in the iSCSI storage stack. The TCP stack embedded in the TOE/RDMA wrapper 428 may be exposed to denial of service attacks and may be maintained. The interface between iSCSI software initiator block 422 and the hardware 440 may also be adjusted to support iSCSI over RDMA known as iSCSI extensions for RDMA (iSER). The iSCSI boot capability may allow the initiator to boot from a disk attached to the system over a network, and iSCSI to communicate with the disk.

The OS iSCSI port driver block 420 may comprise a plurality of port drivers that may be adapted to manage different types of transport, depending on the type of adapter, for example, USB, SCSI, iSCSI or Fiber Channel (FC) in use. The iSCSI software initiator block 422 may be adapted to function with the network stack, for example, iSCSI over TCP/IP and may support both standard Ethernet network adapters and TCP/IP offloaded network adapters, and may also be adapted to support an iSCSI chimney 442. The iSCSI software initiator block 422 may also support the use of accelerated network adapters to offload TCP overhead from a host processor to the network adapter. The iSCSI miniport driver block 424 may comprise a plurality of associate device drivers known as miniport drivers. The miniport driver may enable implementation routines necessary to interface with the storage adapter's hardware. A miniport driver may be combined with a port driver to implement a complete layer in the storage stack.

The iSCSI software initiator block 422 or any other software entity that manages and owns the iSCSI state or a similar entity for other operating systems may comprise suitable logic, circuitry and/or code that may be adapted to receive data from the OS iSCSI port driver 420 and offload it to the hardware block 440 via the iSCSI chimney 442. On a target, the iSCSI software target block may also support the use of accelerated network adapters to offload TCP overhead from a host processor to a network adapter. The iSCSI software target block may also be adapted to use the iSCSI chimney 442.

The sockets layer 426 may be used by the TCP chimney and by any consumer that may need sockets services. The sockets layer 426 may be adapted to interface with the hardware 440 capable of supporting TCP chimney. For non-offloaded TCP communication, the TCP/IP block 430 may utilize transmission control protocol/internet protocol that may be adapted to provide communication across interconnected networks. The network driver interface specification NDIS block 432 may comprise a device-driver specification that may be adapted to provide hardware and protocol independence for network drivers and offer protocol multiplexing so that multiple protocol stacks may coexist on the same host. The NDIS miniport driver block 434 may comprise routines that may be utilized to interface with the storage adapter's hardware and may be coupled to the NDIS block 432 and the virtual bus driver (VBD) block 438. The VBD 438 may be required in order to simplify the hardware 440 system interface and internal handling of requests from multiple stacks on the host, however use of VBD 438 may be optional with the iSCSI chimney 442.

The iSCSI chimney 442 may comprise a plurality of control structures that may describe the flow of data between the iSCSI software initiator block 422 or the iSCSI miniport driver 424 and the hardware block 440 in order to enable a distributed and more efficient implementation of the iSCSI layer. The TOE/RDMA block 428 may comprise suitable logic, circuitry and/or code that may be adapted to implement remote direct memory access that may allow data to be transmitted from the memory of one computer to the memory of another remote computer without passing through either device's central processing unit (CPU). In this regard, extensive buffering and excessive calls to an operating system kernel may not be necessary. The TOE/RDMA block 428 may be coupled to the virtual bus driver block 438 and the iSCSI miniport driver block 424. Specifically to iSCSI, it may be adapted to natively support iSER, or NFS over RDMA or other transports relying on RDMA services. These RDMA services may also be supported on a target.

The virtual bus driver block 438 may comprise a plurality of drivers that facilitate the transfer of data between the iSCSI software initiator block 422 and the hardware block 440 via the iSCSI chimney 442. The virtual bus driver block 438 may be coupled to the TOE/RDMA block 428, NDIS miniport driver block 434, the sockets layer block 426, the other protocols block 436 and the hardware block 440. The other protocols block 436 may comprise suitable logic, circuitry and/or code that may be adapted to implement various protocols, for example, the Fiber Channel Protocol (FCP) or the SCSI-3 protocol standard to implement serial SCSI over Fiber Channel networks. The hardware block 440 may comprise suitable logic and/or circuitry that may be adapted to process received data from the drivers, the network interface and other devices coupled to the hardware block 440.

The iSCSI initiator and iSCSI target devices on a network may be named with a unique identifier and assigned an address for access. The iSCSI initiators and iSCSI target nodes may either use an iSCSI qualified name (IQN) or an enterprise unique identifier (EUI). Both types of identifiers may confer names that may be permanent and globally unique. Each node may have an address comprised of the IP address, the TCP port number, and either the IQN or EUI name. The IP address may be assigned by utilizing the same methods commonly employed on networks, such as dynamic host control protocol (DHCP) or manual configuration. During discovery phase, the iSCSI software initiator 422 or the iSCSI miniport driver 424 may be able to determine or accept it for the management layers OSMI 410, iSCSI initiator services 406, management interface libraries 404 and management utilities and agents 402 for both the storage resources available on a network, and whether or not access to that storage is permitted. For example, the address of a target portal may be manually configured and the initiator may establish a discovery session. The target device may respond by sending a complete list of additional targets that may be available to the initiator.

The Internet Storage Name Service (iSNS) is a device discovery protocol that may provide both naming and resource discovery services for storage devices on the IP network and builds upon both IP and Fiber Channel technologies. The protocol may utilize an iSNS server as a central location for tracking information about targets and initiators. The server may be adapted to run on any host, target, or initiator on the network. The iSNS client software may be required in each host initiator or storage target device to enable communication with the server. In the initiator, the iSNS client may register the initiator and may query the list of targets. In the target, the iSNS client may register the target with the server.

For the initiator to transmit information to the target, the initiator may first establish a session with the target through an iSCSI logon process. This process may start the TCP/IP connection, and verify that the initiator has access rights to the target through authentication. The initiator may authorize the target as well. The process may also allow negotiation of various parameters including the type of security protocol to be used, and the maximum data packet size. If the logon is successful, an ID may be assigned to both the initiator and the target. For example, an initiator session ID (ISID) may be assigned to the initiator and a target session ID (TSID) may be assigned to the target. Multiple TCP connections may be established between each initiator target pair, allowing more transactions during a session or redundancy and fail over in case one of the connections fails.

Figure 4B:
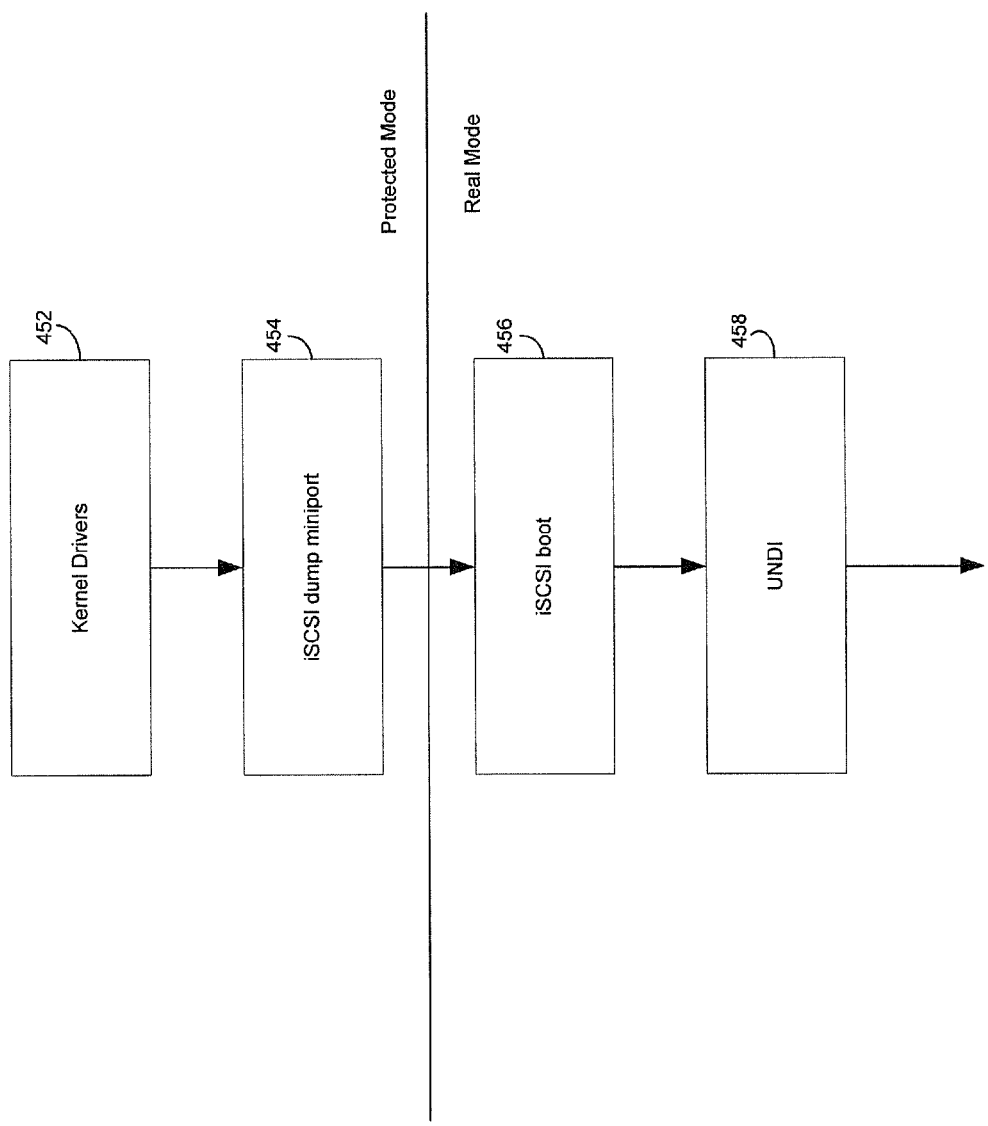
FIG. 4B is a block diagram illustrating utilization of iSCSI boot code during a crash dump, in accordance with an embodiment of the invention.

FIG. 4B is a block diagram illustrating utilization of iSCSI boot code during a crash dump, in accordance with an embodiment of the invention. Referring to FIG. 4B, there is shown a kernel drivers block 452, an iSCSI dump miniport block 454, an iSCSi boot block 456, and an UNDI block 458. After the initial phase of the boot process, the operating system may start to build its services in the protected mode. The new environment may have no ties to the pre-boot driver or kernel drivers 452 that used to get the content of the OS prior to the building of the storage stack. The storage stack in turn may take control of the hardware. The iSCSI dump miniport block 454 may enable implementation of routines necessary to interface with the storage adapter's hardware. An iSCSI dump miniport block 454 may be combined with a port driver to implement a complete layer in the storage stack.

When the operating system storage stack is in control of the hardware, the boot process may need to proceed with read and write operations of more information from the storage device residing on the iSCSI network. The location and name of the storage device used prior to the operating system taking control over the hardware may not be available to the newly established storage driver. One embodiment of this invention allows the iSCSI boot initiator code to pass iSCSI parameters and TCP/IP parameters used in the pre-operating system mode to access the storage target device to the protected mode driver used by the operating system. One embodiment of the invention provides for inserting a block of parameters in the iSCSI controller's internal memory during pre-OS mode. The protected mode driver may extract the information and continue booting.

Another embodiment of the invention allows storage of these parameters in the non-volatile memory attached to the iSCSI hardware, for example, CNIC 110 or HBA 122. In another embodiment of the invention, the parameters may be stored in a memory location agreed upon between the pre-OS and post-OS code. In another embodiment of the invention provides a pre-determined interface, where a default value or user intervention provides the location for the parameter table. In another embodiment of the invention, the parameters may be stored in the host non-volatile memory, for example, Flash memory used for the BIOS. In another embodiment of the invention, the parameters may be stored with a management entity attached to the iSCSI controller, for example, over a unified management port or from a device resident on the network or from a management entity that is network resident. The UNDI 458 and the iSCSI boot 456 code may be utilized for crash dump in real mode.

Figure 5A:
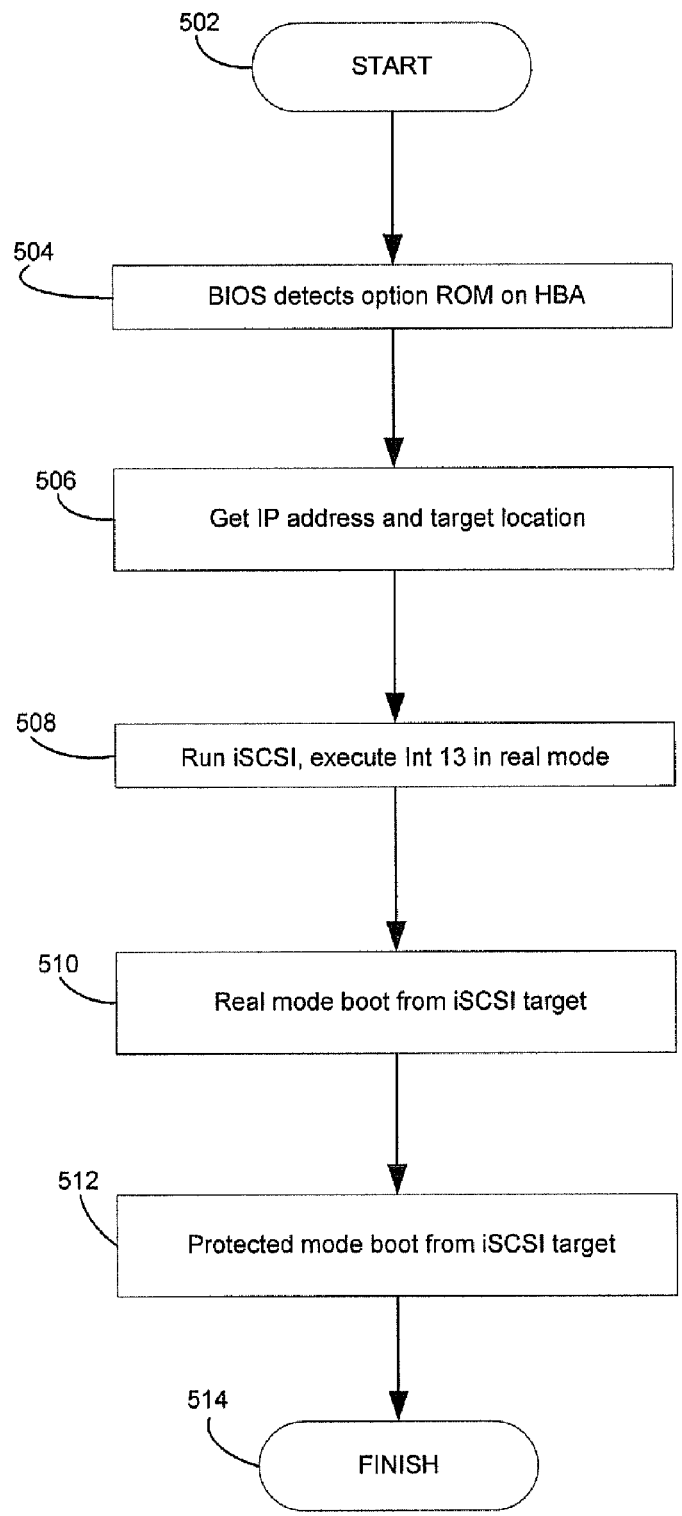
FIG. 5A is a flowchart illustrating exemplary steps for an iSCSI boot sequence, in accordance with an embodiment of the invention.

FIG. 5A is a flow diagram illustrating exemplary steps for an iSCSI boot sequence, in accordance with an embodiment of the invention. Referring to FIG. 5A, exemplary steps may start at step 502. In step 504, the BIOS may detect an option ROM on the HBA. During initialization, the BIOS may detect the HBA expansion ROM and may load the SAN boot BIOS code into memory, for example, memory 106. The client and target parameter information may be acquired. In step 506, client information may be either statically configured or dynamically determined, for example, from a DHCP server. In accordance with an embodiment of the invention, the client information may be determined from a secondary DHCP server. Client information may comprise client's IP address, client's host name, and/or client's initiator information, for example. The path to the iSCSI target information where the OS image is stored may be statically configured or dynamically acquired using DHCP.

In step 508, during chaining of the interrupt handler, for example, INT 13 handler, the iSCSI SAN boot BIOS code may chain itself into INT13h disk I/O handler, for example, and may select boot device disk ID 0x80 for INT13h, for example. The iSCSI SAN boot BIOS code may bind to the network device driver and may hook system INT 13H handler, for example, so that it may redirect disk access requests transparently, during real-mode operation, to a remote disk over the iSCSI protocol. A protocol stack may be established, for example, INT 13 handler, iSCSI Protocol, TCP/IP and network device driver.

In step 510, the master boot record may be detected and loaded from the boot sector after the initiation of an iSCSI connection to the target. After the MBR is detected, the bootstrap code may locate the volume boot record for the active bootable partition and may follow the traditional steps in the boot process. The boot sector may load the network loader (NTLDR) file, for example, which may then begin loading the OS in a series of phases.

In step 512, the iSCSI SAN boot may comprise a boot loader phase. After loading the NTLDR file, for example, the boot loader may switch the processor to operate in a protected mode. The NTLDR file, for example, may enable the system to access all physical memory in protected mode and the NTLDR file, for example, may parse the BOOT.INI file, for example, for boot partition. During a detect and configuring hardware phase, the network detect (NTDETECT) file may be launched to collect hardware information. During a kernel loading phase, the boot BIOS may retrieve network operating system kernel (NTOSKRNL), HAL and/or boot type device drivers. The storage class driver, port driver and/or miniport driver may be started and booting may be continued from the storage stack. During a logon phase, log on process such as Winlogon and/or other subsystem process may be loaded. Control then passes to finish step 514.

Figure 5B:
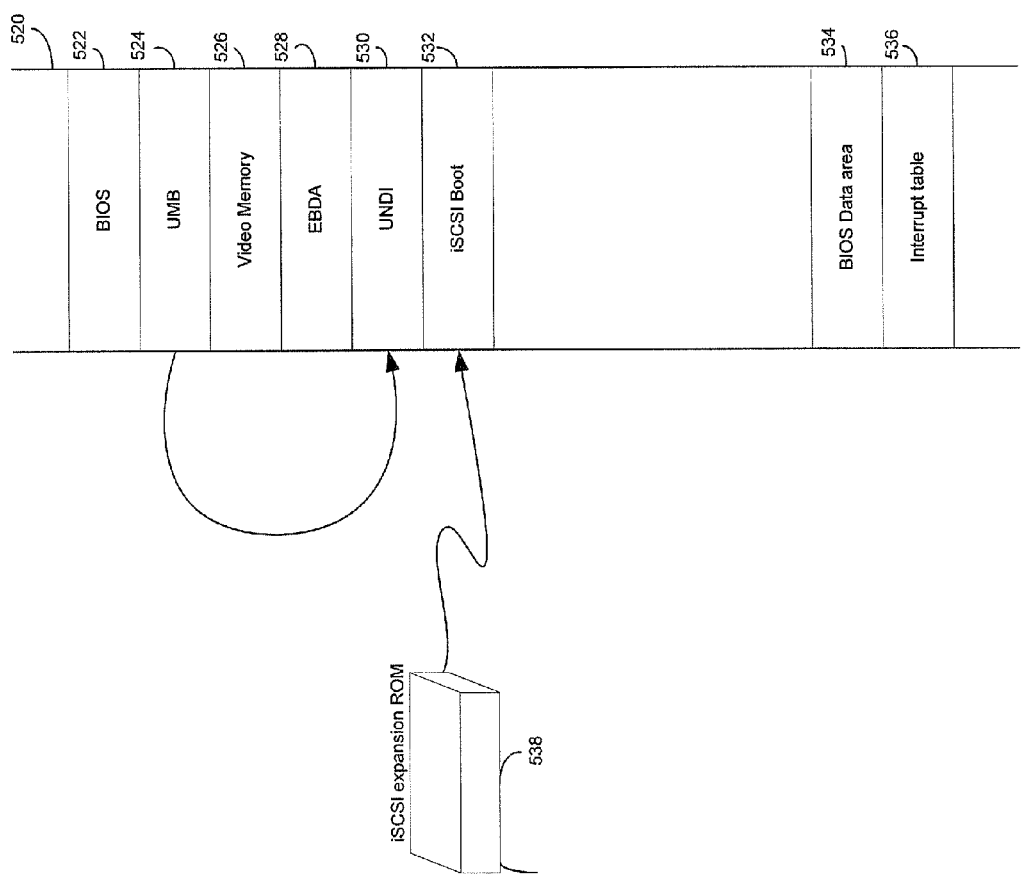
FIG. 5B is a block diagram illustrating a memory map of a stack at boot, in accordance with an embodiment of the invention.

FIG. 5B is a block diagram illustrating a memory map of a stack at boot, in accordance with an embodiment of the invention. Referring to FIG. 5B, there is shown a memory stack 520, and an iSCSI expansion ROM 538. The memory stack 520 may comprise a BIOS 522, an upper memory block (UMB) 522, a video memory 526, an extended BIOS data area (EBDA) 528, a UNDI 530, an iSCSI boot portion 532, a BIOS data area 534, and an interrupt table 536. The BIOS 522 may load multiple boot agents during POST, which contain the loader. When the BIOS 522 invokes BEV, it loads the iSCSI boot initiator code and UNDI 530 into low memory. The iSCSI expansion ROM 538 may contain the iSCSI boot initiator code.

FIG. 5C is a block diagram illustrating a memory map of a stack at crash dump, in accordance with an embodiment of the invention. Referring to FIG. 5C, there is shown a memory stack 520. The memory stack 520 may comprise a BIOS 522, an upper memory block (UMB) 522, a video memory 526, an extended BIOS data area (EBDA) 528, a UNDI 530, an iSCSI boot portion 532, a BIOS data area 534, and an interrupt table 536. The support for crash dump includes allowing personnel to analyze the root cause for the OS crash using the dump data on the storage device. As this environment may be very different from the conditions provided to the iSCSI adapter, memory needs to be provided for the code to run. The system may be unstable, as the OS may have just crashed. The code that drives the iSCSI hardware may not be corrupted. Using the code that is in memory for the boot process including the UNDI driver 530 and the iSCSI stack for the iSCSI adapter may ensure the best robustness possible. This is an area in memory that may not be owned by any other service and the code may be present in memory at all times. One embodiment of the invention may allow the use of the same code used for the boot process for the crash dump. The memory footprint may be smaller and less prone to any attacks, bugs or hardware malfunction and saves the effort required to develop two drivers.

Further protection against hardware malfunction, may be provided by the use of the CPU controlled page tables. By marking the relevant pages in the page table of the CPU as read only, any software access to that area protecting the code may be prevented from corruption. After the boot code has been placed in this selected area of memory, the driver may access the page tables to flip the bits protecting this area into read only. The chipset and memory controller may provide another service of identifying a DMA access to that area by a hardware device, thus improving the robustness of the solution.

Figure 6:
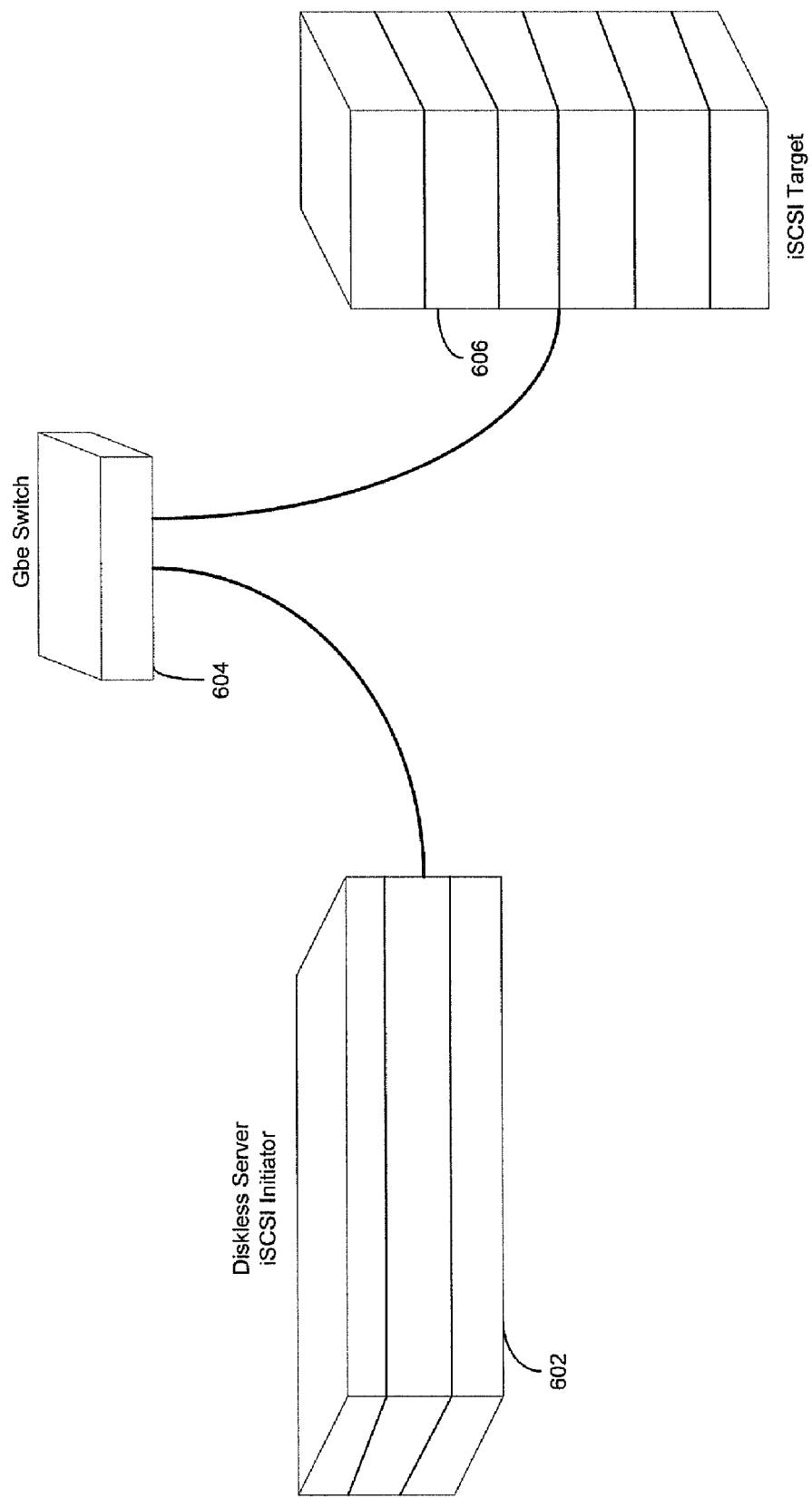
FIG. 6 is a block diagram illustrating an exemplary iSCSI boot implementation utilizing an iSCSI target, in accordance with an embodiment of the invention.

FIG. 6 is a block diagram illustrating an exemplary iSCSI boot implementation utilizing an iSCSI target, in accordance with an embodiment of the invention. Referring to FIG. 6, there is shown an iSCSI initiator 602, Gigabit Ethernet (GbE) switch 604 and an iSCSI target 606.

The diskless server iSCSI initiator 602 may comprise a network controller with full iSCSI host bus adaptor (HBA) or a NIC, which may be utilized during iSCSI boot and for handling network traffic. The iSCSI initiator 602 may be adapted to receive specific SCSI commands from a server, encode these SCSI commands into iSCSI Protocol Data Units (PDU) and encapsulate these iSCSI PDU's inside TCP/IP packet(s) that may be embedded into Ethernet frames and sent to the Gigabit Ethernet (GbE) switch 604 over a switched or routed SAN storage network. The Gigabit Ethernet (GbE) switch 604 may comprise suitable logic and/or circuitry that may be coupled to the iSCSI initiator 602, the IP-based SAN and the iSCSI target 606. The iSCSI target 606 may comprise suitable logic, circuitry and/or code that may be adapted to receive an Ethernet frame, strip at least a portion of the frame, and recover the TCP/IP content. The iSCSI target 606 may also be adapted to decode the iSCSI PDU's and send SCSI commands and forward the SCSI commands to an IP storage device. During an exemplary iSCSI boot, the diskless server iSCSI initiator 602 may utilize a Gigabit Ethernet (GbE) switch 604 and an iSCSI target 606 to achieve iSCSI boot.

Figure 7:
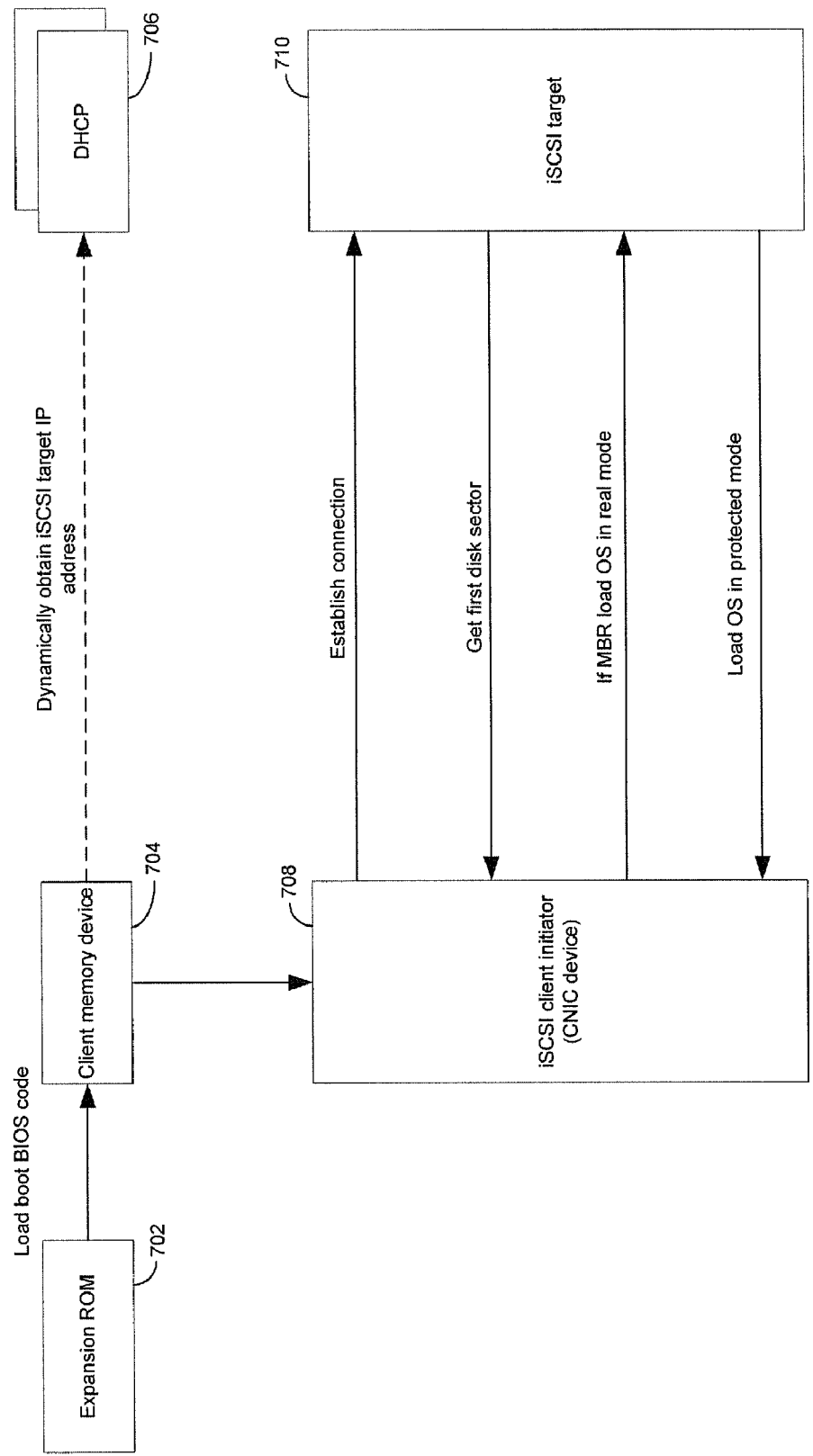
FIG. 7 is a flow diagram illustrating exemplary steps for an iSCSI boot sequence, in accordance with an embodiment of the invention.

FIG. 7 is a flow diagram illustrating exemplary steps for an iSCSI boot sequence, in accordance with an embodiment of the invention. Referring to FIG. 7, there is shown, an expansion ROM block 702, a client device memory 704, a plurality of DHCP servers 706, an iSCSI client initiator 708, and an iSCSI target 710. The boot BIOS code may be loaded from the expansion ROM block 702 to the iSCSI client device memory 704. The iSCSI client device memory 704 may dynamically obtain iSCSI target IP addresses from the plurality of DHCP servers 706. The iSCSI client device memory 704 may enable chaining of the INT 13 handler and the statically configured target IP addresses may be obtained from the iSCSI client initiator 708. The iSCSI client initiator 708 may establish a connection to the iSCSI target 710. The iSCSI target 710 may obtain the first disk sector from the iSCSI client initiator 708. If the first disk sector is a master boot record (MBR), then the OS may be loaded in real mode at the iSCSI target 710. The master boot record may comprise a bootstrap code, a master partition table and signature bytes. The boot sector may load the network loader (NTLDR) file in memory, which may then begin loading the operating system (OS) in a series of phases. The NTLDR file may be loaded to collect hardware information and registry information. The operating system may be remotely booted in protected mode from the iSCSI target 710 by the iSCSI client device 708 after the NTLDR file is loaded.

Certain aspects of a method for iSCSI boot may include detecting at least one read only memory (ROM) comprising boot BIOS code on at least one host bus adapter (HBA). A boot BIOS code may be loaded into memory if at least one boot ROM comprising the boot BIOS code is detected. An Internet protocol (IP) address and/or an iSCSI target location of a client may be received. The boot BIOS code may be chained to at least one interrupt handler over iSCSI protocol. At least one iSCSI connection may be initiated to the iSCSI target based on chaining at least one interrupt handler over iSCSI protocol. The iSCSI target may be booted in real mode if at least one master boot record is detected.

Certain aspects of a system for iSCSI boot may comprise at least one processor, for example, the CPU 108 that detects at least one read only memory (ROM) comprising boot BIOS code on at least one host bus adapter (HBA). The processor, for example, the CPU 108 may be adapted to load the boot BIOS code into memory 106 if the ROM is detected. The processor, for example, the CPU 108 may be adapted to receive at least one of an Internet protocol (IP) address and an iSCSI target location of a client. The processor, for example, the CPU 108 may be adapted to chain the boot BIOS code to at least one interrupt handler over iSCSI protocol. The processor, for example, the CPU 108 may be adapted to initiate at least one iSCSI connection to the iSCSI target 606 based on chaining at least one interrupt handler over iSCSI protocol. The processor, for example, the CPU 108 may determine if at least one master boot record is located in a hard disk drive. The CPU 108 may enable booting in real mode from the iSCSI target 606 after loading the located master boot record into memory 106.

The processor, for example, the CPU 108 may be adapted to receive the IP address and/or the iSCSI target location of the client by at least one of static configuration of the iSCSI target 606 and dynamic determination of the iSCSI target 606. The processor, for example, the CPU 108 may be adapted to dynamically determine the iSCSI target 606 from a dynamic host configuration protocol (DHCP) server. In accordance with an embodiment of the invention, the client information may be determined from a secondary DHCP server. The processor, for example, the CPU 108 may be adapted to chain the boot BIOS code to at least one interrupt handler to redirect disk access requests during the real mode to at least one remote disk over the iSCSI protocol. The processor, for example, the CPU 108 may attempt to locate at least one master boot record. The processor, for example, the CPU 108 may be adapted to locate at least one volume boot record for an active bootable partition if at least one master boot record is located. The MBR may comprise a bootstrap code, a master partition table and signature bytes. A desired partition used to boot an OS such as Windows, for example, may be detected as set to active, or bootable set to 80h, for example, in the master partition table in order to proceed. The boot sector may load the network loader (NTLDR) file in memory, which may then begin loading the operating system (OS) in a series of phases. The processor, for example, the CPU 108 may be adapted to load at least one file, for example, NTLDR to collect at least one of hardware information and registry information. At least one processor, for example, the CPU 108 may be switched to boot in protected mode after at least one file, for example, NTLDR is loaded.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for performing an Internet Small Computer System Interface (iSCSI) boot operation, the method comprising:
    loading by an iSCSI client device, boot basic input/output system (BIOS) code from one or both of: a host bus adapter, or a network interface controller (NIC);
    receiving an IP address of an iSCSI target based on said loaded boot BIOS code, wherein said iSCSI target is determined from at least one dynamic host configuration protocol (DHCP) server, wherein parameters used to access a storage device during a pre-operating system mode is inserted in memory of the iSCSI client device before remotely booting an operating system; and
    remotely booting the operating system from said iSCSI target based on chaining said loaded boot BIOS code to at least one interrupt handler, wherein the parameters used to access the storage device are extracted by the operating system from the memory after the operating system is successfully booted in a post-operating system mode.

2. The method according to claim 1, comprising establishing a connection to said iSCSI target based on said loaded boot BIOS code.

3. The method according to claim 1, comprising receiving said IP address of said iSCSI target by a static configuration of said iSCSI target.

4. The method according to claim 1, comprising redirecting disk access requests during a real mode to at least one remote disk based on said chaining.

5. The method according to claim 1, comprising loading said boot BIOS code and a universal network driver interface (UNDI) driver based on a boot entry vector.

6. The method according to claim 1, comprising booting in real mode from said iSCSI target based on loading a master boot record into memory.

7. The method according to claim 6, comprising locating at least one volume boot record for an active bootable partition based on locating said master boot record in a hard disk drive.

8. The method according to claim 1, comprising remotely booting said operating system from said iSCSI target in a protected mode based on loading at least one file, wherein said at least one file is loaded to collect one or both of: hardware information and/or registry information.

9. The method according to claim 1, comprising initiating an iSCSI connection to said iSCSI target based on said chaining.

10. A system for performing an Internet Small Computer System Interface (iSCSI) boot operation, the system comprising:
    one or more processors for use in an iSCSI client device, said one or more processors being operable to load boot basic input/output system (BIOS) code from one or both of: a host bus adapter or a network interface controller (NIC);
    said one or more processors are operable to receive an IP address of an iSCSI target based on said loaded boot BIOS code, wherein said iSCSI target is determined from at least one dynamic host configuration protocol (DHCP) server, wherein parameters used to access a storage device during a pre-operating system mode is inserted in memory of the iSCSI client device before remotely booting an operating system; and
    said one or more processors are operable to remotely boot the operating system from an iSCSI target based on chaining said loaded boot BIOS code to at least one interrupt handler, wherein the parameters used to access the storage device are extracted by the operating system from the memory after the operating system is successfully booted in a post-operating system mode.

11. The system according to claim 10, wherein said one or more processors are operable to establish a connection to said iSCSI target based on said loaded boot BIOS code.

12. The system according to claim 10, wherein said one or more processors are operable to receive said IP address of said iSCSI target by a static configuration of said iSCSI target.

13. The system according to claim 10, wherein said one or more processors are operable to redirect disk access requests during a real mode to at least one remote disk based on said chaining.

14. The system according to claim 10, wherein said one or more processors are operable to load said boot BIOS code and a universal network driver interface (UNDI) driver based on a boot entry vector.

15. The system according to claim 10, wherein said one or more processors are operable to boot in real mode from said iSCSI target based on loading a master boot record into memory.

16. The system according to claim 15, wherein said one or more processors are operable to locate at least one volume boot record for an active bootable partition based on locating said master boot record in a hard disk drive.

17. The system according to claim 10, wherein said one or more processors are operable to remotely boot said operating system from said iSCSI target in a protected mode based on loading at least one file, wherein said at least one file is loaded to collect one or both of: hardware information and/or registry information.

18. The system according to claim 10, wherein said one or more processors are operable to initiate an iSCSI connection to said iSCSI target based on said chaining.

19. A method for performing an Internet Small Computer System Interface (iSCSI) boot operation, the method comprising:

loading by an iSCSI client device, boot basic input/output system (BIOS) code from a host bus adapter; and remotely booting an operating system from an iSCSI target based on chaining said loaded boot BIOS code to at least one interrupt handler, wherein said iSCSI target is determined from at least one dynamic host configuration protocol (DHCP) server, wherein parameters used to access a storage device during a pre-operating system mode is inserted in memory of the iSCSI client device before remotely booting an operating system, wherein the parameters used to access the storage device are extracted by the operating system from the memory after the operating system is successfully booted in a post-operating system mode.

* * * * *